Nov. 27, 1934.    S. G. RUSSELL ET AL    1,981,925
FISHING REEL BUSHING APPLIANCE
Filed Jan. 2, 1934
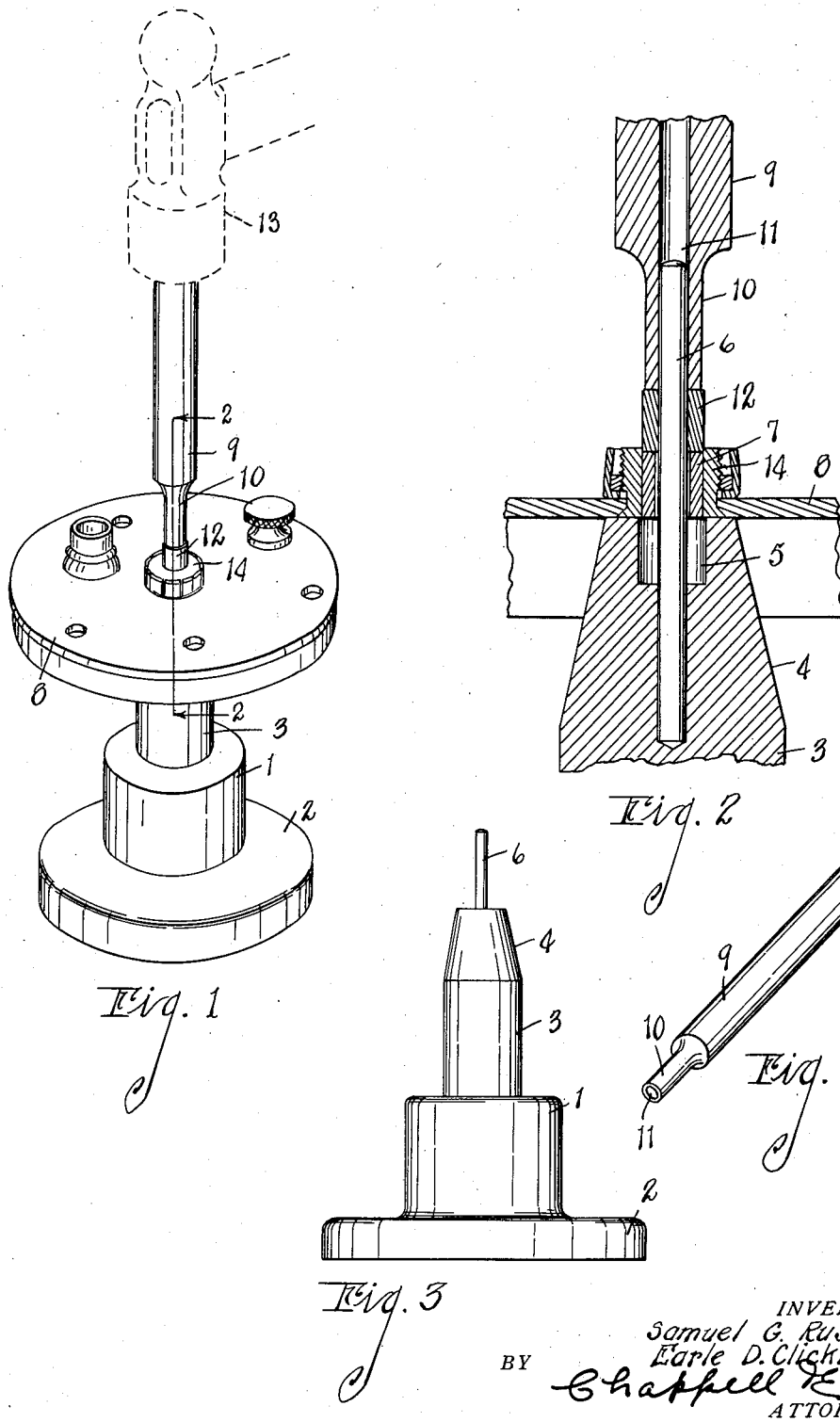
INVENTORS
Samuel G. Russell
Earle D. Clickner
BY Chappell Earl
ATTORNEYS Patented Nov. 27, 1934

1,981,925

UNITED STATES PATENT OFFICE 1,981,925

FISHING REEL BUSHING APPLIANCE

Samuel G. Russell and Earle D. Clickner, Kalamazoo, Mich., assignors to Shakespeare Company, Kalamazoo, Mich.

Application January 2, 1934, Serial No. 704,822

6 Claims. (Cl. 29—88.2)

The main object of our invention is to provide an appliance for renewing the bushings of fishing reels and similar work, the appliance being especially well adapted for use by laymen such as, for example, the retail dealers of fishing tackle.

Another object is to provide an appliance of this character which is simple and economical, easy to manipulate and very effective in operation.

Objects relating to details and economies of our invention will appear from the description to follow. The invention is defined and pointed out in the claims.

A structure which is a preferred embodiment of our invention is illustrated in the accompanying drawing, in which:

Fig. 1 is a perspective view of a fishing reel bushing appliance embodying the features of our invention in operation, the hammer for tapping the drift pin being shown in dotted fragmentary outline.

Fig. 2 is an enlarged fragmentary section on a line corresponding to line 2—2 of Fig. 1.

Fig. 3 is a view in side elevation of the anvil assembly.

Fig. 4 is a perspective view of the drift pin.

In the illustrated embodiment of our invention, numeral 1 indicates an anvil base block preferably formed of cast iron and having a flange-like bottom portion 2. On this is an upright reel work support or anvil 3. In the embodiment illustrated the anvil has an upwardly tapered top portion 4. This anvil is provided with a bushing receiving socket 5 preferably of a depth equal to the length of the old or removed bushing. A guide stem or pilot 6 is mounted on the anvil axially or centrally of the socket 5 so as to project above the face of the anvil.

With the parts thus arranged, the guide stem or pilot is adapted to project through the old bushing 7 of the work such as the reel frame end plate 8, the bushing of which it is desired to remove or replace, with the end plate resting upon the anvil and supported thereon by the pilot as shown in Fig. 2. The pilot will, it is observed, guide the removed bushing into the socket as well as support the work on the anvil. In practice, the socket is of such diameter as to permit free removal or discharge of the removable bushing from the socket. The pilot 6 is adapted to receive and guide the new bushing into the bearing sleeve 14 secured to the reel plate 8.

The drift pin 9 has a lower end 10 of reduced diameter and a central longitudinal bore 11 opening thereto for fittingly receiving the guide stem 6 when the reel end plate is arranged on the support and the new bushing 12 is arranged on the guide stem above and in contact with the old bushing.

Thus, the old bushing 7 is replaced by the new bushing 12 on tapping the upper end of the drift pin with a hammer 13. In this operation, the socket 5 limits the downward travel of the parts so that the new bushing is accurately positioned axially of the reel plate when the operation is completed. The reel plate with its new bushing can then be readily removed from the appliance. The old bushing is removed from the socket by merely inverting the anvil.

With reference to the drawing, it is to be understood that clearances have been exaggerated for the purpose of clearness of illustration. We refer particularly to the clearance between the old bushing 7 and the guide stem or pilot 6, Fig. 2.

This appliance enables unskilled persons to quickly renew bushings in fishing reels and the like without injury to the parts. This avoids the loss of time and expense incident to returning the reel to the factory for renewing the bushings as has heretofore been the common practice.

We have illustrated and described our improvements in an embodiment which we have found very practical. We have not attempted to illustrate or describe other embodiments or adaptations, as it is believed this disclosure will enable those skilled in the art to embody or adapt our improvements as may be desired.

Having thus described our invention, what we claim as new and desire to secure by Letters Patent, is:

1. In a fishing reel bushing appliance, the combination of a base block having an annular bottom flange, a reel plate support mounted on said base block and having a tapered upper end portion and a removed bushing socket, the depth of which is equal to the length of the removed bushing, and a guide stem mounted in said support and projecting upwardly through the center of said socket and substantially above the top of said support, and a drift pin having a lower end of reduced diameter and a central longitudinal bore opening thereto for fittingly receiving said guide stem when the reel plate is arranged on said support with said guide stem projecting upwardly through the removed bushing and the new bushing is arranged on said guide stem above and in contact with the removed bushing, whereby the removed bushing is replaced by the new bushing on tapping the upper end of said drift pin with a hammer, said removed bushing socket limiting the downward travel of the parts so that the new bushing is accurately positioned axially of the reel plate when the operation of renewing the bushing is completed.

2. In a fishing reel bushing appliance, the combination of a support, a socket, a guide stem mounted in said support and projecting upwardly through the center of said socket and substantially above the top of said support, and a drift pin having a lower end of reduced diameter and a central longitudinal bore opening thereto for fittingly receiving said guide stem.

3. In a fishing reel bushing appliance, the combination of a reel plate support having a tapered upper end portion and a socket, the depth of which is equal to the length of the bushing, and a guide stem mounted in said support and projecting upwardly from said socket and substantially above the top of said support, and a drift pin having a lower end of reduced diameter and a central longitudinal bore opening thereto for fittingly receiving said guide stem, said socket limiting the downward travel of the parts so that the new bushing is accurately positioned axially of the reel when the operation of renewing the bushing is completed.

4. In a fishing reel bushing appliance, the combination of a support having an upper end socket, the depth of which is equal to the length of the bushing, and a guide stem mounted in said support and projecting upwardly from said socket and substantially above the top of said support, and a drift pin having a central longitudinal bore for fittingly receiving said guide stem.

5. In a fishing reel bushing appliance, the combination of a base block having an annular bottom flange, a reel plate support mounted on said base block and having a tapered upper end portion and a bushing socket, the depth of which is equal to the length of the bushing, and a guide stem mounted in said support and projecting upwardly through the center of said socket and substantially above the top of said support.

6. In a fishing reel bushing appliance, the combination of a support, a bushing socket, and a guide stem mounted in said support and projecting upwardly through the center of said socket and substantially above the top of said support.

SAMUEL G. RUSSELL.
EARLE D. CLICKNER.